United States Patent
Hazelet et al.

(10) Patent No.: US 9,548,937 B2
(45) Date of Patent: Jan. 17, 2017

(54) BACKPRESSURE TECHNIQUES FOR MULTI-STREAM CAS

(71) Applicant: INTEL CORPORATION, Santa Clara, CA (US)

(72) Inventors: Keith Hazelet, Chandler, AZ (US); Ziv Kfir, Yavne (IL); Christopher Thornburg, Gilbert, AZ (US); Barak Hermesh, Pardes Hana (IL)

(73) Assignee: INTEL Corporation, Santa Clara, CA (US)

( * ) Notice: Subject to any disclaimer, the term of this patent is extended or adjusted under 35 U.S.C. 154(b) by 215 days.

(21) Appl. No.: 14/139,512

(22) Filed: Dec. 23, 2013

(65) Prior Publication Data

US 2015/0180787 A1    Jun. 25, 2015

(51) Int. Cl.
*H04J 3/02* (2006.01)
*H04L 12/835* (2013.01)
*H04L 12/801* (2013.01)
*H04L 12/863* (2013.01)

(52) U.S. Cl.
CPC .............. *H04L 47/30* (2013.01); *H04L 47/29* (2013.01); *H04L 47/621* (2013.01)

(58) Field of Classification Search
None
See application file for complete search history.

(56) References Cited

U.S. PATENT DOCUMENTS

| 6,034,945 A * | 3/2000 | Hughes .............. H04L 12/5601 370/230 |
| 6,252,849 B1 * | 6/2001 | Rom ...................... H04L 47/10 370/230 |
| 7,792,027 B2 | 9/2010 | Tatar et al. |
| 8,027,252 B2 | 9/2011 | Woehler et al. |
| 8,027,256 B1 | 9/2011 | Subramanian et al. |
| 2002/0116522 A1 * | 8/2002 | Zelig ...................... H04L 47/10 709/235 |
| 2002/0146023 A1 * | 10/2002 | Myers .................... H04L 47/10 370/412 |
| 2002/0167955 A1 | 11/2002 | Shimojo |

(Continued)

OTHER PUBLICATIONS

International Search Report and Written Opinion issued for PCT/US2014/066085. Mailed Feb. 16, 2015. 13 pages.

*Primary Examiner* — Kwang B Yao
*Assistant Examiner* — Juvena Loo
(74) *Attorney, Agent, or Firm* — Finch & Maloney PLLC (57) ABSTRACT

Techniques are disclosed for controlling data transmission in multi-stream digital systems. The techniques disclosed allow an input stream to a conditional access system to be throttled when a FIFO begins to fill up. Each data stream may have its own FIFO, which sends data to a MUX and exports its status to a backpressure rate control module. Multiple seconds worth of data may be stored in a BPRC buffer ahead of the backpressure rate control module prior to being transmitted to a MUX FIFO buffer. The backpressure rate control module may use the cached data to fill available spaces within a MUX FIFO buffer. The determination to forward a data packet may be based on the individual MUX FIFO buffer levels, the sum of all the MUX FIFO buffer levels, and/or one or more configurable threshold values. In some embodiments, individual thresholds may be assigned to each FIFO buffer.

18 Claims, 6 Drawing Sheets

(56) References Cited

U.S. PATENT DOCUMENTS

| | | | |
|---|---|---|---|
| 2003/0227876 A1* | 12/2003 | Ruutu | H04L 12/5693 370/252 |
| 2004/0005142 A1* | 1/2004 | Yoo | G11B 20/10 386/241 |
| 2005/0089054 A1* | 4/2005 | Ciancaglini | H04L 49/3045 370/412 |
| 2006/0164979 A1* | 7/2006 | Pirbhai | H04L 47/10 370/229 |
| 2006/0164989 A1* | 7/2006 | Hart | H04L 43/0894 370/235 |
| 2006/0192850 A1* | 8/2006 | Verhaegh | H04L 12/2854 348/14.12 |
| 2009/0103434 A1* | 4/2009 | Madsen | H04L 47/10 370/232 |
| 2011/0255402 A1 | 10/2011 | Fourcand | |

* cited by examiner

BACKPRESSURE TECHNIQUES FOR MULTI-STREAM CAS

BACKGROUND

Conditional access systems or so-called CAS are typically used in the context of digital television systems, such as cable and satellite television, and are configured to ensure the protection of content by requiring certain conditions to be satisfied before access to the content is granted. A CAS architecture generally includes a tuner, a first-in first-out (FIFO) buffer, a multiplexor, and a termination device such as a CableCARD™ developed by CableLabs®. The FIFO buffer is typically implemented as a small low-latency FIFO that the multiplexor clocks packets out of, and can be integrated into the silicon of the multiplexor. The multiplexor, sometimes referred to as a MUX, is typically implemented in accordance with a given standard, such as the OpenCable™ specification. In typical operation, data is received from the tuner, queued up in an FIFO buffer and then sent to the multiplexor. The queuing in the FIFO is used to prevent temporal packet collisions as multiple packet streams are coalesced into a single time-multiplexed stream.

DETAILED DESCRIPTION

Techniques are disclosed for controlling data packet transmission in multi-stream digital systems based on the status of given data stream buffers normally included in such systems. The techniques can be used, for instance, in the context of a multi-stream conditional access system (CAS) system that includes a FIFO buffer for each stream and a multiplexor that pulls data from each FIFO buffer to provide an aggregated stream that is then provided to a CAS termination device. In such cases, the system can be configured to allow at least one input stream to be throttled (to a higher data rate) if the existing MUX FIFO buffers of other streams begin to fill up, based on given MUX FIFO threshold values being exceeded. The backpressure rate control module may also be configured to gate the data streams (to a lower data rate), to ensure that packet loss will not result from concurrent bitrate spikes on all the streams. In one particular embodiment, each MUX FIFO buffer exports its status to a backpressure rate control module that is configured to hold or forward data packets from a data stream based on the level of the MUX FIFO buffers. The backpressure rate control module includes or is otherwise coupled to a large data buffer that is configured to hold seconds worth of data for filling available spaces within the downstream FIFO buffer from which the MUX pulls data (MUX FIFO buffer). To this end, note that this large buffer is distinct from the MUX FIFO buffer and may be implemented, for example, as a double-data rate (DDR) FIFO memory external to the multiplexor or given CAS integrated circuitry. The determination to forward a data packet may be based on, for example, the MUX FIFO buffer status levels considered on an individual basis, the sum of all the MUX FIFO buffer status levels, and/or one or more configurable threshold values. In some embodiments, individual thresholds may be assigned to each MUX FIFO buffer. The backpressure rate control module can therefore prevent MUX FIFO overflow and/or fill in MUX FIFO gaps or otherwise underutilized buffer space to achieve rates faster than normal. Numerous variations and embodiments will be apparent in light of this disclosure.

For purposes of this disclosure, note that the existing FIFO buffers from which the CAS MUX pulls data may be referred to as "MUX FIFO buffer" or "MUX FIFO module" or "MUX data buffer" or "MUX memory" or "MUX cache" or "internal FIFOs" or "internal FIFO buffers" or the like, and the large data buffers or buffer to which the backpressure rate control module or modules pull data may be referred to as "backpressure rate control module cache" or "backpressure rate control data buffer" or "BPRC data cache" or "BPRC data buffer" or "BPRC memory" or "external FIFOs" or "external FIFO buffers" or the like, where 'BPRC' generally stands for backpressure rate control. As will be appreciated in light of this disclosure, the use of "internal" and "external" with respect to the different stream buffers is not intended to implicate any kind of structural limitation, but is merely used in effort to distinguish between the two types of memories. In some embodiments, the so-called external FIFO buffer or cache or data buffer may very well be integrated into the silicon of the CAS system and to that extent may become internal to that system. In such cases, the use of external would not be intended to contradict that implementation.

As will be further appreciated, not all streams of a given multi-stream CAS have to be configured in accordance with the present disclosure. For instance, each of a sub-set of the given CAS streams may be configured with a backpressure rate control module and a BPRC memory as described herein, and the balance of the CAS streams can be configured as conventionally done. In such a case, the streams having no backpressure rate control can be generally referred to as "direct" data streams (where the data stream passes from the tuner directly to the MUX FIFO) and the streams having backpressure rate control can be generally referred to as "indirect" data streams (where the data stream passes from the tuner to the MUX FIFO via the backpressure rate control circuitry).

Further note that the MUX FIFO buffer circuitry may be implemented as one large buffer that is shared by all direct and indirect streams, or as separate buffers for each of the direct and indirect streams, or some combination of such individual and shared buffers. Likewise, note that the BPRC data buffer circuitry may be implemented as one large buffer that is shared by all indirect streams, or as separate buffers for each indirect stream, or some combination of such individual and shared buffers. To this end, any reference to each stream having the various buffers described herein is not intended to necessarily implicate a particular buffer circuitry or physical structure. Numerous individual and shared memory structures can be used, as will be appreciated in light of this disclosure.

General Overview

Conditional access systems involve a number of non-trivial challenges, and such systems have faced particular complications with regard to multiple concurrent stream processing. For instance, in digital video broadcasting, conditional access systems enable one or more digital data streams to be received and consumed by an authorized user. Conditional access systems may be implemented using a physical card, such as CableCARD™ or downloadable conditional access software, in some cases. Conditional access systems, such as CableCARD™ used in North American digital cable television, have constraints with respect to multiple concurrent stream processing. In some cases, a FIFO buffer and MUX arrangement is located between receiving data packets and the CAS termination device so that the packets may be held off and sent in sequence. If one or more of the streams needs to burst cached data (such as temporal reference frames) at a faster than normal rate to, for example, support fast channel-change or some other high data rate situation, the bursting stream may quickly fill the FIFO, resulting in packet loss.

Thus, and in accordance with an embodiment of the present disclosure, techniques are disclosed for controlling data packet transmission based on the current level of a given data stream's FIFO module. The techniques can be used, for example, in the context of a multi-stream CAS system that includes a FIFO buffer for each stream and a multiplexor that pulls data from each FIFO buffer to provide an aggregated stream. In one specific embodiment, the backpressure data transmission techniques described herein allow at least one input stream of a CAS to be throttled up (to a higher data rate) when the MUX FIFO of other streams begin to fill up or otherwise exceed given thresholds, assuming the MUX FIFO of the stream to be throttled is currently underutilized. In addition, or alternatively, the backpressure data transmission techniques of one embodiment allow the input streams of a CAS to be gated or throttled down (to a lower data rate) to prevent packet loss resulting from concurrent bitrate spikes on all streams. The backpressure data transmission techniques can be implemented with a backpressure rate control module configured to receive MUX FIFO fill status and a data cache operatively coupled to that backpressure rate control module. The BPRC data cache is relatively large and in one embodiment can hold, for instance, 2 to 12 seconds of stream data. As will be appreciated, the size of the BPRC buffer can be set based on, for example, quality of service (QoS) goals and/or historical worst-case performance data (or other empirical data).

The MUX can be, for example, an OpenCable™ MUX or any other suitable multiplexor. Data may be received from the tuner, queued up in the MUX FIFO, and then sent to the MUX. The queuing in the MUX FIFO is used to prevent temporal packet collisions as multiple packet streams are coalesced into a single time-multiplexed stream. In some embodiments, one or more so-called indirect data streams may have an external FIFO or cache or other memory (e.g., for fast channel-change as provided herein), and therefore those streams may be gated, throttled, or otherwise rate-regulated using a backpressure rate control module prior to the MUX FIFO. In such embodiments, each of the MUX FIFOs (including both those associated with direct streams and those associated with indirect streams) exports its status to each backpressure rate control module, so that backpressure rate control module can hold or forward data packets from its data stream based on all the MUX FIFO levels. The BPRC buffer or so-called external FIFO may be a large FIFO buffer for caching multiple seconds worth of data and may reside, for example, in dynamic random access memory (DRAM) that is external to the integrated circuitry of the existing CAS system (e.g., external to the tuner, FIFO and MUX silicon). Generally, there will be unused space in one or more of the internal MUX FIFOs since the average aggregate bitrate is lower than the maximum rate of the CAS. The internal MUX FIFOs will only reach their peak level during a concurrent bitrate spike on all filtered channels, such that at any given moment one of the internal FIFOs will likely not be completely full. This can be exploited, in accordance with an embodiment.

In one specific example embodiment, the termination device coupled to the output of the MUX is a CableCARD™ interface, which uses an 8-bit 27 MHz parallel transport bus and allows for about 203 megabits/second of MPEG transport data. Given that cable streams may be 38.8 megabits/second each, the CableCARD™ only has sufficient bandwidth for five streams. In order to increase the number of streams (such as six maximum streams with a 203 megabits/second CableCARD™) supported by the CAS, the streams may be pre-filtered ahead of the CAS interface in order to remove packets from programs not being viewed or recorded. Such filtering may lower the average bitrate of each stream to about 20-30 megabits/second. Filtering alone, however, may be in sufficient for some applications. In particular, even though the average bitrate is now low enough to send more than five streams after pre-filtering, there may be instances where packets are received on multiple interfaces concurrently. This requires a MUX FIFO between receiving packets and the CAS multiplexor (sometimes referred to as the CAS interface) so that the packets may be held off and sent in sequence. The size of the FIFO (either one FIFO for all streams or a separate FIFO for each stream) must be such that it can absorb a temporary 38.8 megabit/second concurrent rate on all streams. This can happen when two adjacent packets in the input stream are both accepted through the filter. The duration of the high rate depends on the percentage of packets being filtered out (filtering just under half of the stream theoretically results in two adjacent packets) and how well the MUX interleaved the various streams within the transport. The probability of all streams experiencing these peaks at the same time is sufficiently high given the high frequency of packet transmission, which may be nearly 28,000 packets per second on each stream, in some such embodiments. As previously explained, if one or more of the streams needs to burst cached data (such as temporal reference frames) at a faster than normal rate to, for example, support fast channel-change or some other high data rate situation, the bursting stream may quickly fill the MUX FIFO, resulting in packet loss, unless a backpressure rate control scheme as variously provided herein is employed. So, in two specific examples and continuing with the CableCARD™ interface example, six data streams may be achieved using the various techniques provided herein by implementing five direct data streams and one indirect data stream, or four direct data streams and two indirect data streams, wherein each indirect data stream is data-rate regulated by a backpressure rate control module.

In more detail, the backpressure rate control module, in some embodiments, can fill in the gaps with the burst of cached data from the sixth (or additional) data streams, achieving rates faster than normal. For example, if each of six data streams is pre-filtered down to an average of 25 megabits/second (MbPS) and one of the six streams was bursting, the cached data can be transmitted at a theoretical average rate of three times the normal playback rate (203 MbPS/25 MbPS=8). In some such embodiments, this must be controlled on a per-packet level to manage the rate of traffic being sent to the multiplexor, ensuring that the MUX FIFOs never fill and packets are never lost. For example, streams using the backpressure rate control module may be temporarily throttled if the MUX FIFOs for the other streams fill up. The backpressure rate control logic may also be used, in some embodiments, to gate the indirect data streams (outside of a cached data burst) to ensure that packet loss will not result from concurrent bitrate spikes on all the streams. This may enable a shrinking of the MUX FIFO sizes below what they otherwise would need to be without the ability to throttle on one of the streams, in some embodiments. Said differently, throttling to a higher rate on one stream at one point in time when appropriate can be used to compensate for gating to a lower rate on the streams at another point in time.

A backpressure rate control module as provided herein may use various methodologies to determine when to hold or forward a data packet to the internal or so-called MUX FIFO, in accordance with some embodiments. Such a determination to forward a data packet may be based on the status information of each MUX FIFO as well as one or more configurable thresholds. In one example embodiment, the backpressure rate control module may forward a data packet only when the MUX FIFO statuses indicate a combined fill level of all the MUX FIFOs (including both direct and indirect streams) is below a configurable global threshold. In other embodiments, the backpressure rate control module may forward a data packet only when that status of each MUX FIFO (including both direct and indirect streams) indicates that FIFO's fill level is below an individual threshold value. In such embodiments, each individual MUX FIFO fill threshold may be user configurable in order to prioritize specific channels. In still other embodiments, a combination of the methodologies described above may be used, such that a data packet may be forwarded only when each MUX FIFO (including both direct and indirect streams) status indicates a fill level that is below an individual threshold and all the MUX FIFO statuses indicate that the combined fill level of all the MUX FIFOs (including both direct and indirect streams) is below a configurable global threshold.

Numerous applications and uses will be appreciated in light of this disclosure. For instance, the techniques described herein may directly use the FIFO status information to schedule when to gate or forward data packets. It may be possible, in some embodiments, to implement more advanced behaviors in this way, such as quality of service monitoring by prioritizing some MUX FIFO modules (high QoS channels) and allowing data packets to drop on others (lower QoS channels). If multiple streams require backpressure rate control (multiple cached channels for fast channel change), synchronization may also be needed between the decision-making logic for each channel.

System and Operation

Figure 1:
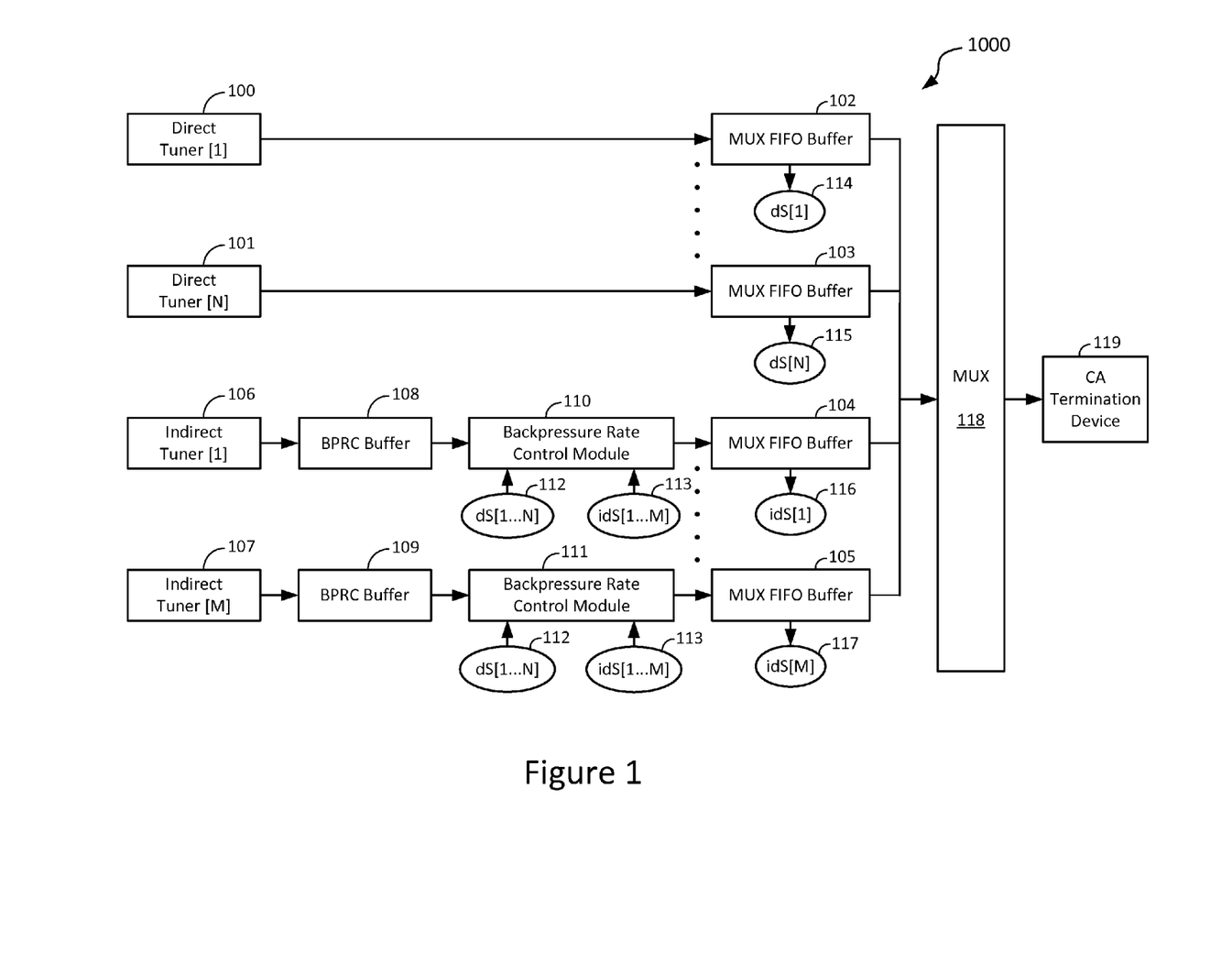
FIG. 1 illustrates an example backpressure data packet transmission system configured in accordance with an embodiment of the present disclosure.

FIG. 1 illustrates an example backpressure data packet transmission system 1000 configured in accordance with an embodiment of the present disclosure. As can be seen in this particular example, system 1000 includes multiple direct tuners 100-101 and multiple indirect tuners 106-107. Each of the direct and indirect tuners, in this embodiment, transmits data to its own MUX FIFO module 102-105. The MUX FIFO modules can be, for example, low latency FIFO buffers implemented into the silicon of the MUX or the silicon of the CAS, and they may queue up the data packets received from the tuners prior to sending the data packets to the MUX 118 and eventually to the CAS termination device 119, in some embodiments. As discussed above, the MUX may be, for example, an OpenCable™ MUX and the CAS termination device may be a CableCARD™ interface, downloadable conditional access software, or any other suitable CAS termination device. Each of the 1-N direct tuners 100-101 transmits data packets directly to the MUX FIFO modules 102-103, while each of the 1-M indirect tuners 106-107 transmits data packets to backpressure rate control circuitry. In this particular example, the backpressure rate control circuitry includes BPRC buffers 108-109, and backpressure rate control modules 110-111. In other embodiments, the backpressure rate control circuitry may be a single chip or chip set and may include or otherwise be connected to a processor for monitoring and performing calculations on the MUX FIFO buffer levels, etc. In one specific example, the BPRC buffers 108-109 are double-data rate (DDR) FIFO buffers configured to store multiple seconds worth of data ahead of the backpressure rate control modules 110-111 and the MUX FIFOs 104-105. The BPRC buffers can be implemented in DRAM external to the silicon, in some embodiments. In other embodiments, the BPRC buffers may be single data-rate buffers, triple data-rate buffers, or any other buffer suitable for temporarily storing data packets. In DDR devices, bandwidth is doubled, as compared with a single data-rate device, without increasing clock speed or bus width by clocking data on the rising and falling edges of clock signals. As can be further seen in this example, data transmission from the indirect data streams to the MUX FIFO buffers 104-105 may be controlled using backpressure rate control modules 110-111. In some embodiments, the MUX FIFO buffers and/or the BPRC buffers may be implemented, for instance, as volatile memory devices such as, but not limited to, Random Access Memory (RAM), DRAM, or Static RAM (SRAM). As discussed above, the MUX FIFO buffer circuitry may be implemented, in some embodiments, as one large buffer that is shared by all direct and indirect data streams, or as separate buffers for each of the direct and indirect streams, or some combination of such individual and shared buffers. Likewise, the BPRC buffer circuitry may be implemented as one large shared buffer, separate individual buffers, or some combination of individual and shared buffers.

MUX FIFO buffers 102-103 associated with the 1-N direct tuners 100-101 have a value or direct status level dS[1]-dS[N], indicated by elements 114-115 in the example shown in FIG. 1. Similarly, MUX FIFO modules 104-105 associated with the 1-M indirect tuners 106-107 have a value or indirect status level idS[1]-idS[M], indicated by elements 116-117 in the example shown in FIG. 1. In this example, each of the MUX FIFO modules 102-105 exports its status 114-117 to the backpressure rate control modules 110-111 so that data from the indirect data streams may be transmitted based on the status levels of the MUX FIFO modules 102-105. In this example embodiment, the direct status dS[1 . . . N] of each of the MUX FIFO modules 102-103 is communicated to the backpressure rate control modules at 112, while the indirect status idS[1 . . . M] of each of the FIFO modules 104-105 is communicated to the backpressure rate control modules at 113. At any given moment, the status 114-117 of one of the MUX FIFOs will likely not be completely full because the FIFO buffers 102-105 will only reach their peak level during a concurrent bitrate spike on all filtered channels or data streams. As discussed above, the backpressure rate control modules 110-111 may monitor the available space of the MUX FIFO buffers 102-105 and can fill in the gaps with a burst of cached data from the BPRC buffers 108-109, achieving rates faster than normal in some embodiments. The backpressure rate control modules 110-111 may also be used, in some embodiments, to gate one or more of the data streams outside of a cached data burst to ensure that packet loss will not result from concurrent bitrate spikes on all the streams. This may enable a shrinking of the FIFO sizes without throttling one of the data streams, in some embodiments.

The backpressure rate control modules 110-111 may use various methodologies to determine when to hold or forward a data packet to the MUX FIFO modules 102-105, in some embodiments. Such a determination to forward a data packet may be based on the status information 114-117 of each MUX FIFO, as well as one or more configurable thresholds. In one example embodiment, the backpressure rate control modules 110-111 may forward a data packet only when the sum of each MUX FIFO status level 114-117 is below a global threshold value. In such embodiments, the backpressure rate control modules 110-111 may include or otherwise be connected to a processor (not shown) for calculating the aggregate value of the MUX FIFO status levels 114-117. In other embodiments, the backpressure rate control modules 110-111 may forward a data packet only when each MUX FIFO status level 114-117 is below an individual threshold value. In such embodiments, the backpressure rate control modules 110-111 may be configured to compare each status level 114-117 with a configurable threshold value. In some embodiments a single threshold value may be used for all the MUX FIFO modules 102-105, while in other embodiments each module may be assigned its own threshold value in order to prioritize specific channels or data streams. In still other embodiments, a combination of the methodologies described above may be used, such that a data packet may be forwarded only when each of the MUX FIFO levels 114-117 is below an individual threshold and the sum of all the MUX FIFO levels 114-117 is below a configurable global threshold.

As will be appreciated, various other data packet transmission methodologies may be implemented by the backpressure rate control modules 110-111 which take into consideration the current levels 114-117 of the MUX FIFO buffers 102-105 and forward data packets accordingly, and the present disclosure is not intended to be limited to any specific data transmission scheme. In this example embodiment, each data stream has its own MUX FIFO module 102-105 and each indirect data stream has its own BPRC buffer 108-109 and its own backpressure rate control module 110-111, however, in other embodiments additional or fewer such modules may be incorporated within system 1000.

In various embodiments, system 1000 can be implemented within any computing device, mobile or otherwise, which receives multiple digital data streams, as will be apparent in light of this disclosure. For instance, computing system 1000 may be incorporated within or otherwise include: a digital cable/starlight television box; a laptop/notebook computer; a tablet computer; a mobile phone or smartphone; a personal digital assistant (PDA); a cellular handset; a handheld gaming device; a gaming platform; a desktop computer; and/or a videoconferencing system. Also, computing system 1000 can be configured for wired (e.g., Universal Serial Bus or USB, Ethernet, FireWire, etc.) and/or wireless (e.g., Wi-Fi®, Bluetooth®, etc.) communication, for example, with one or more other portions of system 1000 (e.g., direct tuners 100-101, MUX FIFOs 102-105, backpressure rate control modules 110-111, etc.). Other suitable types and configurations for system 1000 will depend on a given application and will be apparent in light of this disclosure.

In some embodiments, the backpressure rate control modules 110-111, or any other functional module of system 1000, can be implemented, for example, in any suitable programming language, such as C, C++, objective C, JavaScript, custom or proprietary instruction sets, etc. The modules can be encoded, for example, on a machine-readable medium that, when executed by a processor, carries out the desired functionality of controlling the transmission of data packets. The computer-readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chipset or other such purpose-built logic. Some embodiments can be implemented with a microcontroller having input/output capability (e.g., inputs for receiving user inputs; outputs for directing other components) and a number of embedded routines for carrying out a given desired functionality. In a more general sense, the functional modules of system 1000 can be implemented in hardware, software, and/or firmware, as desired.

Methodologies

Figure 2A:
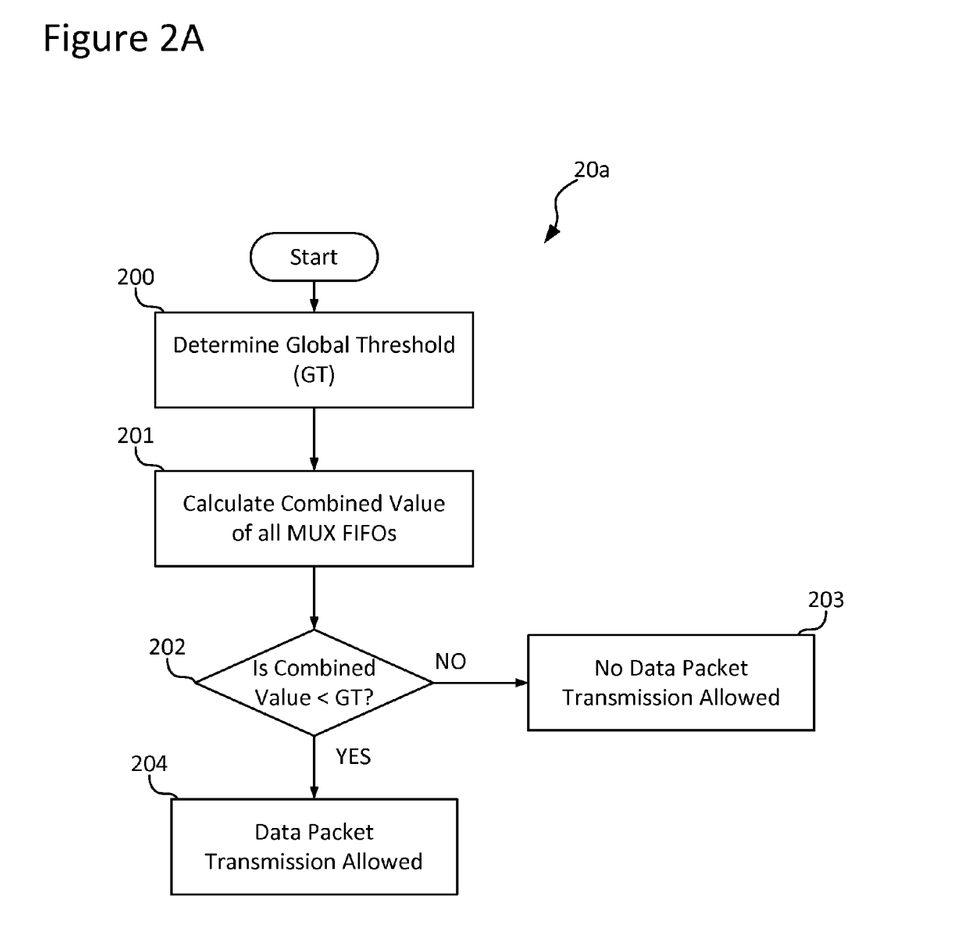
FIG. 2A is a flow diagram illustrating a method for determining when to forward a data packet, in accordance with an embodiment of the present disclosure.

FIG. 2A is a flow diagram illustrating a method for determining when to forward a data packet, in accordance with an embodiment of the present disclosure. The method 20a of FIG. 2A can be implemented, for example, using system 1000 (discussed above), in some embodiments. As can be seen, method 20a may begin as in block 200 with determining a global threshold value. As previously discussed, the global threshold value may be user configurable, in some embodiments. In one specific example, one or more indirect data streams 106-107 may be prioritized by assigning a different global threshold value for each indirect data stream. The method may proceed as in block 201 with calculating the combined value of all the MUX FIFO modules 102-105. As previously discussed, each MUX FIFO 102-105 may export its status level 114-117 to the backpressure rate control modules 110-111 so that each control module can make decisions based on the combined level of the FIFOs. Next, the method may continue with determining 202 whether or not the combined level of the FIFOs is less than the global threshold. If the combined level of the FIFO modules is not below the global threshold value, the method may continue as in block 203 with not allowing any data packet transmission. If data packets are not transmitted, they may be cached, as discussed above, using a BPRC buffer. If, however, the combined level of the FIFO modules is below the global threshold value, the method may continue as in block 204 with allowing a data packet transmission. As mentioned above, in some embodiments a different global threshold value may be assigned for each indirect data stream 106-107 and the comparison 202 may be performed for multiple indirect data streams. In such embodiments, the backpressure rate control modules 110-111 may forward a data packet on one data stream before another based on the global threshold value assigned to each stream.

Figure 2B:
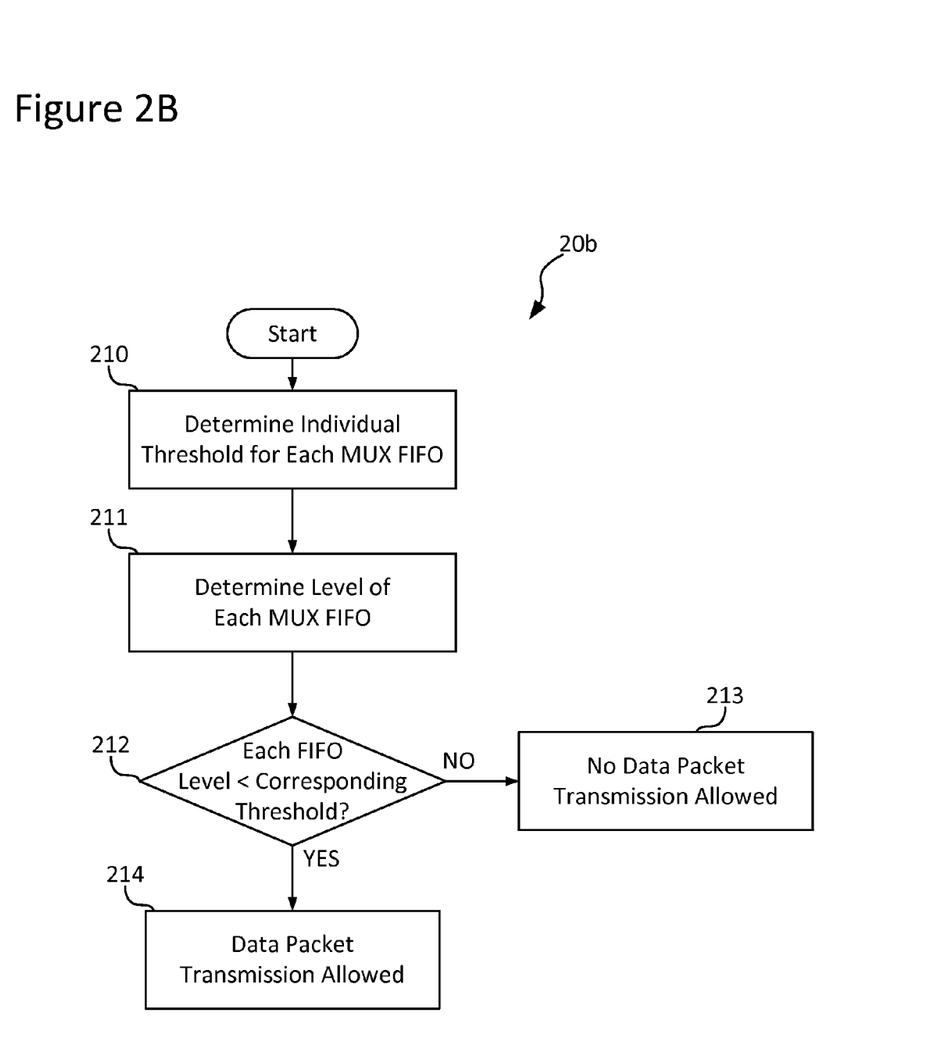
FIG. 2B is a flow diagram illustrating a method for determining when to forward a data packet, in accordance with another embodiment of the present disclosure.

FIG. 2B is a flow diagram illustrating a method for determining when to forward a data packet, in accordance with another embodiment of the present disclosure. The method 20b of FIG. 2B can be implemented, for example, using system 1000 (discussed above), in some embodiments. As will be appreciated in light of this disclosure, and in accordance with some embodiments, the method 20b of FIG. 2B can be utilized as an alternative to or in conjunction with method 20a. As can be seen, method 20b may begin as in block 210 with determining an individual threshold value for each MUX FIFO module 102-105. As previously discussed, the individual threshold values may be user configurable, in some embodiments, and it may be possible to prioritize specific data channels by assigning different FIFO thresholds for each data stream. The method may proceed as in block 211 with determining the level for each of the FIFO modules 102-105. As previously discussed, each MUX FIFO 102-105 may export its status level or value 114-117 to the backpressure rate control modules 110-111 so that each control module can make decisions based on the FIFO levels. Next, the method may continue with determining 212 whether or not each FIFO level is less than its corresponding threshold value. If the level of each FIFO module is not below its corresponding threshold value, the method may continue as in block 213 with not allowing any data packet transmission. As discussed above, non-transmitted data packets may be cached in a BPRC buffer, in some embodiments. If, however, the level of each FIFO module is below its corresponding threshold value, the method may continue as in block 204 with allowing a data packet transmission. In some embodiments, the threshold level is the same for each FIFO module such that a data packet is forwarded only when each of the FIFOs is below a certain set level. As mentioned above, in other embodiments a different threshold value may be assigned for each of the MUX FIFO modules 102-105, thus prioritizing certain data streams.

Figure 2C:
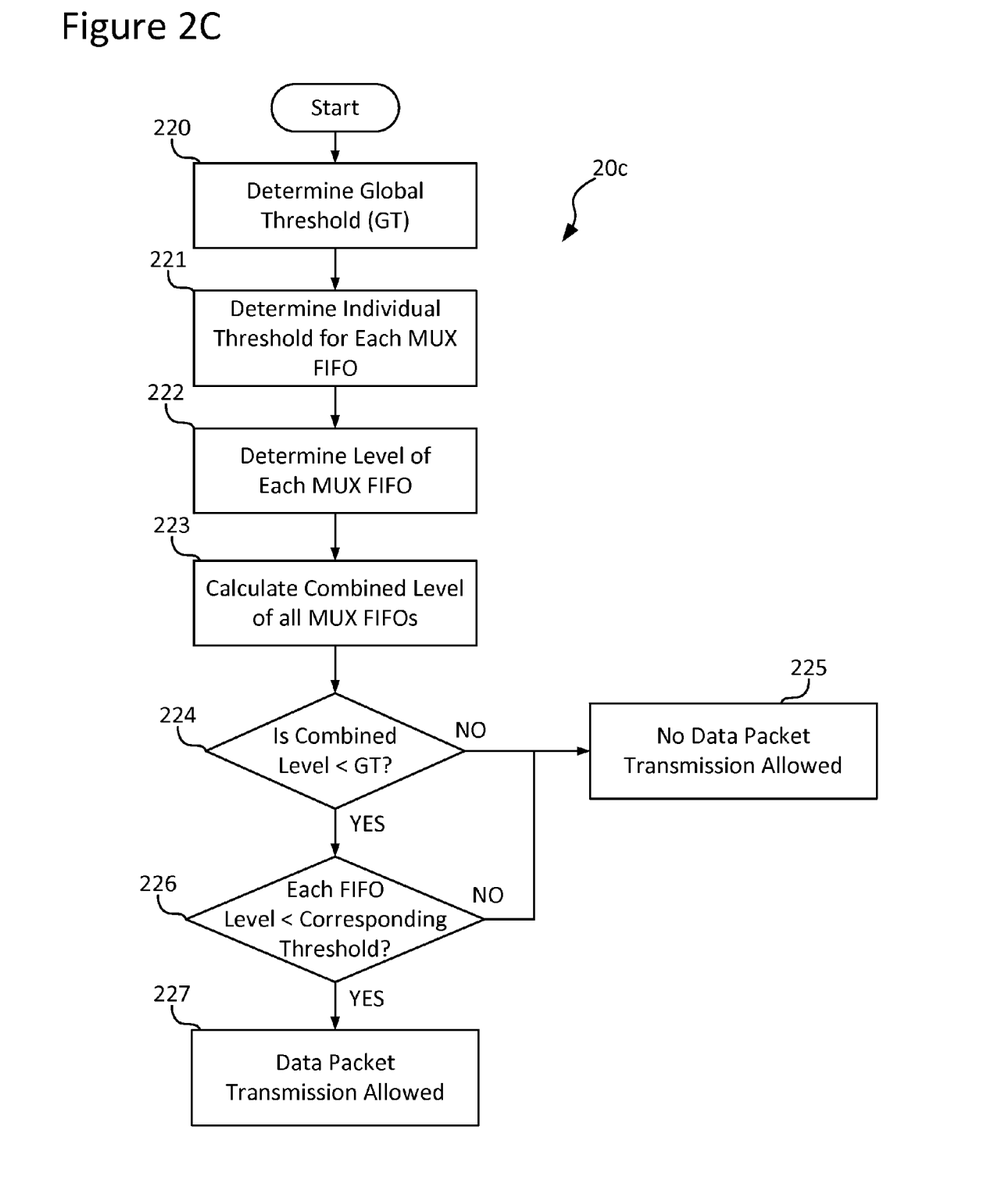
FIG. 2C is a flow diagram illustrating a method for determining when to forward a data packet, in accordance with another embodiment of the present disclosure.

FIG. 2C is a flow diagram illustrating an method for determining when to forward a data packet, in accordance with another embodiment of the present disclosure. The method 20c of FIG. 2C can be implemented, for example, using system 1000 (discussed above), in some embodiments. As will be appreciated in light of this disclosure, and in accordance with some embodiments, the method 20c of FIG. 2C can be utilized as an alternative to or in conjunction with methods 20a and 20b. As can be seen, method 20c may begin as in block 220 with determining a global threshold value. As previously discussed, the global threshold value may be user configurable, in some embodiments. In one specific example, one or more indirect data streams 106-107 may be prioritized by assigning a different global threshold value for each indirect data stream. The method may continue as in block 221 with determining an individual threshold value for each MUX FIFO module 102-105. As previously discussed, the individual threshold values may be user configurable, in some embodiments, and it may be possible to prioritize specific data channels by assigning different FIFO thresholds for each data stream. The method may proceed as in block 222 with determining the level for each of the FIFO modules 102-105. As previously discussed, each MUX FIFO 102-105 may export its status or level 114-117 to the backpressure rate control modules 110-111 so that each control module can make decisions based on the FIFO levels. The method may proceed as in block 223 with calculating the combined level of all the MUX FIFO modules 102-105. Next, the method may continue with determining 224 whether or not the combined level of the FIFOs is less than the global threshold. If the combined level of the FIFO modules is not below the global threshold value, the method may continue as in block 225 with not allowing any data packet transmission. If, however, the combined level of the FIFO modules is below the global threshold value, the method may continue with determining 226 whether or not each FIFO level is less than its corresponding threshold value. If the level of each FIFO module is not below its corresponding threshold value, the method may continue as in block 225 with not allowing any data packet transmission. As discussed above, non-transmitted data packets may be cached in a BPRC buffer, in some embodiments. If, however, the level of each FIFO module is below its corresponding threshold value, the method may continue as in block 227 with allowing a data packet transmission. In some embodiments, the threshold level is the same for each FIFO module such that a data packet is forwarded only when each of the FIFOs is below a certain set level, and the combined level of all the FIFO modules is below the global threshold. As mentioned above, in other embodiments a different threshold value may be assigned for each of the MUX FIFO modules 102-105 and a different global threshold value may be assigned for each indirect data stream 106-107, thus prioritizing certain data streams.

In accordance with some embodiments, use of the method 20a of FIG. 2A (e.g., controlling data transmission based on a global FIFO threshold), method 20b of FIG. 2B (e.g., controlling data transmission based on individual FIFO thresholds), and/or the method 20c of FIG. 2C (e.g., controlling data transmission based on a combination of individual FIFO thresholds and a global FIFO threshold) may provide for controlling data packet transmission from multiple data streams. As will be appreciated, various other data packet transmission methods may be implemented which take into consideration the current levels of the FIFO modules and forward data packets accordingly, and the present disclosure is not intended to be limited to the methods discussed above. Other suitable uses for the disclosed techniques will depend on a given application and will be apparent in light of this disclosure.

Example System

Figure 3:
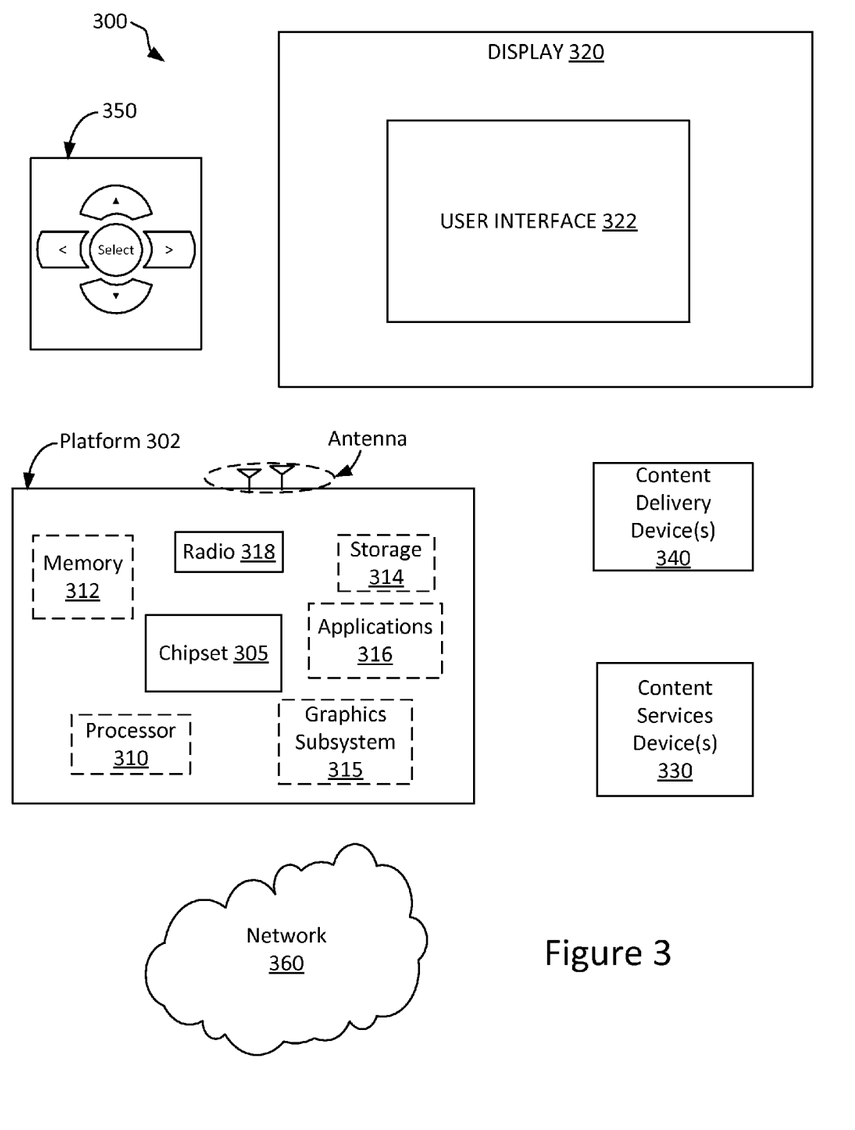
FIG. 3 illustrates an example system that may carry out the techniques for backpressure data packet transmission as described herein, in accordance with some embodiments.

FIG. 3 illustrates an example system 300 that may carry out the backpressure data packet transmission techniques described above, in accordance with some embodiments. In some embodiments, system 300 may be a media system, although system 300 is not limited to this context. For example, system 300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of receiving multiple data streams at a time.

As shown in FIG. 3, the system 300 may also include various modules configured to perform the functionality of the backpressure data packet transmission techniques as variously described herein. For example, the external FIFO/cache modules 108-109, backpressure rate control modules 110-111, MUX FIFO modules 102-105, MUX 118, and/or CA termination device 119 may be located in the content services device(s) 330, content delivery device(s) 340, or within one or more of the dashed line components of system 300 shown in FIG. 3, such as within a processor 310 (e.g., a CPU or APU), memory 312, storage 314, a graphics subsystem 315 (e.g., a GPU), and/or an application(s) module 316 of platform 302.

In some embodiments, system 300 comprises a platform 302 coupled to a display 320. Display 320 may use non-backlit or backlit display technologies, or some combination thereof. Platform 302 may receive one or more content/data streams from a content device such as content services device(s) 330 or content delivery device(s) 340 or other similar content sources. A navigation controller 350 comprising one or more navigation features may be used to interact, for example, with platform 302 and/or display 320. Each of these example components is described in more detail below. Content services device(s) 330 and/or content delivery device(s) 340 may be hosted by any national, international, and/or independent service and thus may be accessible to platform 302 via the Internet or other network, for example.

In some embodiments, platform 302 may comprise any combination of a chipset 305, processor 310, memory 312, storage 314, graphics subsystem 315, applications 316, and/or radio 318. Chipset 305 may provide intercommunication among processor 310, memory 312, storage 314, graphics subsystem 315, applications 316, and/or radio 318. For example, chipset 305 may include a storage adapter (not depicted) capable of providing intercommunication with storage 314. In some embodiments, memory module 312 and/or applications module 316 can be implemented, for example, in any suitable programming language, such as C, C++, objective C, JavaScript, custom or proprietary instruction sets, etc. The various modules of system 300 can be encoded, for example, on a machine-readable medium that, when executed by the processor, carries out the functionality of system 300. The machine-readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic. Some embodiments can be implemented with a microcontroller having input/output capability (e.g., inputs for receiving user inputs; outputs for directing other components) and a number of embedded routines for carrying out the device functionality. In a more general sense, the functional modules of memory 312, applications 316, and the other functional modules of system 300 can be implemented in hardware, software, and/or firmware, as desired. Application programming interfaces (APIs) may also be included in various embodiments to specify how some software components should interact with each other. For example, APIs such as OpenGL or DirectX may be included to help with the graphics/rendering pipeline.

Processor 310 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 310 may comprise dual-core processor(s), dual-core mobile processor(s), and so forth. In some embodiments, processor 310 may include an accelerated processing unit (APU), which may be designed to accelerate one or more types of computations outside of a CPU or may be designed to replace a very specific task. Memory 312 may be implemented, for instance, as a volatile memory device such as, but not limited to, a RAM, DRAM, or SRAM. Storage 314 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 314 may comprise technology to increase the storage performance enhanced protection for valuable digital media when multiple hard drives are included, for example.

Graphics subsystem 315 may perform processing of images such as still or video for display. Graphics subsystem 315 may be a graphics processing unit (GPU) or a visual processing unit (VPU), for example. An analog or digital interface may be used to communicatively couple graphics subsystem 315 and display 320. For example, the interface may be any of a High-Definition Multimedia Interface (HDMI), DisplayPort, wireless HDMI, and/or wireless HD compliant techniques. Graphics subsystem 315 could be integrated into processor 310 or chipset 305. Graphics subsystem 315 could be a stand-alone card communicatively coupled to chipset 305. In some embodiments, graphics subsystem 315 and/or CA termination device 119 may transmit data to content delivery device(s) 340 via any suitable networking protocol.

Radio 318 may include one or more radios capable of transmitting and receiving signals using various suitable wireless communications techniques. In some embodiments, radio 318 may be used, for example, to deliver data from CA termination device 119 to the display 320, or more generally to facilitate communication between platform 302 and display 320, content services device(s) 330, content delivery device(s) 340, navigation controller 350, and/or network 360. Such techniques may involve communications across one or more wireless networks. Exemplary wireless networks may include, but are not limited to, wireless local area networks (WLANs), wireless personal area networks (WPANs), wireless metropolitan area network (WMANs), cellular networks, and satellite networks. In communicating across such networks, radio 318 may operate in accordance with one or more applicable standards in any version.

In some embodiments, display 320 may comprise any television or computer-type monitor or display. Display 320 may comprise, for example, a liquid crystal display (LCD) screen, electrophoretic display (EPD) or liquid paper display, flat panel display, touchscreen display, television-like device, and/or a television. Display 320 may be digital and/or analog. In some embodiments, display 320 may be a holographic or three-dimensional (3-D) display. Also, display 320 may be a transparent surface that may receive a visual projection. Such projections may convey various forms of information, images, and/or objects. For example, such projections may be a visual overlay for a mobile augmented reality (MAR) application. Under the control of one or more software applications 316, platform 302 may display a user interface 322 on display 320.

Techniques for backpressure data packet transmission control, as described herein, may be implemented in various hardware architectures. For example, the techniques described herein may be implemented in various hardware architectures (e.g., having portions performed by a CPU, GPU, and/or APU). In still another embodiment, the techniques may be implemented by a general purpose processor, including a multi-core processor. Content services device(s) 330 may be coupled to platform 302 and/or to display 320. Platform 302 and/or content services device(s) 330 may be coupled to a network 360 to communicate (e.g., send and/or receive) media information to and from network 360. Content delivery device(s) 340 also may be coupled to platform 302 and/or to display 320. In some embodiments, content services device(s) 330 may comprise a cable television box, personal computer (PC), network, telephone, Internet-enabled devices or appliance capable of delivering digital information and/or content, and any other similar device capable of unidirectionally or bi-directionally communicating content between content providers and platform 302 and/or display 320, via network 360 or directly. It will be appreciated that the content may be communicated unidirectionally and/or bi-directionally to and from any one of the components in system 300 and a content provider via network 360. Examples of content may include any media information including, for example, video, music, graphics, text, medical and gaming content, and so forth.

Content services device(s) 330 receives content such as cable television programming including media information, multiple digital data streams, and/or other content, in one embodiment. Examples of content providers may include any cable or satellite television or radio or Internet content providers. The provided examples are not meant to limit the present disclosure. In some embodiments, platform 302 may receive control signals from navigation controller 350 having one or more navigation features. The navigation features of controller 350 may be used to interact with user interface 322, for example. In some embodiments, navigation controller 350 may be a pointing device that may be a computer hardware component (specifically human interface device) that allows a user to input spatial (e.g., continuous and multi-dimensional) data into a computer. Many systems such as graphical user interfaces (GUI) and televisions and monitors allow the user to control and provide data to the computer or television using physical gestures.

Movements of the navigation features of controller 350 may be echoed on a display (e.g., display 320) by movements of a pointer, cursor, focus ring, or other visual indicators displayed on the display. For example, under the control of software applications 316, the navigation features located on navigation controller 350 may be mapped to virtual navigation features displayed on user interface 322, for example. In some embodiments, controller 350 may not be a separate component but integrated into platform 302 and/or display 320. Embodiments, however, are not limited to the elements or in the context shown or described herein, as will be appreciated.

In some embodiments, drivers (not shown) may comprise technology to enable users to instantly turn on and off platform 302 like a television with the touch of a button after initial boot-up, when enabled, for example. Program logic may allow platform 302 to stream content to media adaptors or other content services device(s) 330 or content delivery device(s) 340 when the platform is turned "off." In addition, chip set 305 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 300 may be integrated. For example, platform 302 and content services device(s) 330 may be integrated, or platform 302 and content delivery device(s) 340 may be integrated, or platform 302, content services device(s) 330, and content delivery device(s) 340 may be integrated, for example. In various embodiments, platform 302 and display 320 may be an integrated unit. Display 320 and content service device(s) 330 may be integrated, or display 320 and content delivery device(s) 340 may be integrated, for example. These examples are not meant to limit the present disclosure.

In various embodiments, system 300 may be implemented using any interface or medium whether it be a wireless system, a wired system, or a combination of both. When implemented as a wireless system, system 300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the radio frequency (RF) spectrum and so forth. When implemented as a wired system, system 300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 302 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, image, video, text and so forth. Control information may refer to any data representing commands, instructions, or control words meant for an automated system. For example, control information may be used to route media information through a system or instruct a node to process the media information in a predetermined manner (e.g., using the techniques for real-time projected image adjustment as described herein). The embodiments, however, are not limited to the elements or context shown or described in FIG. 3.

Figure 4:
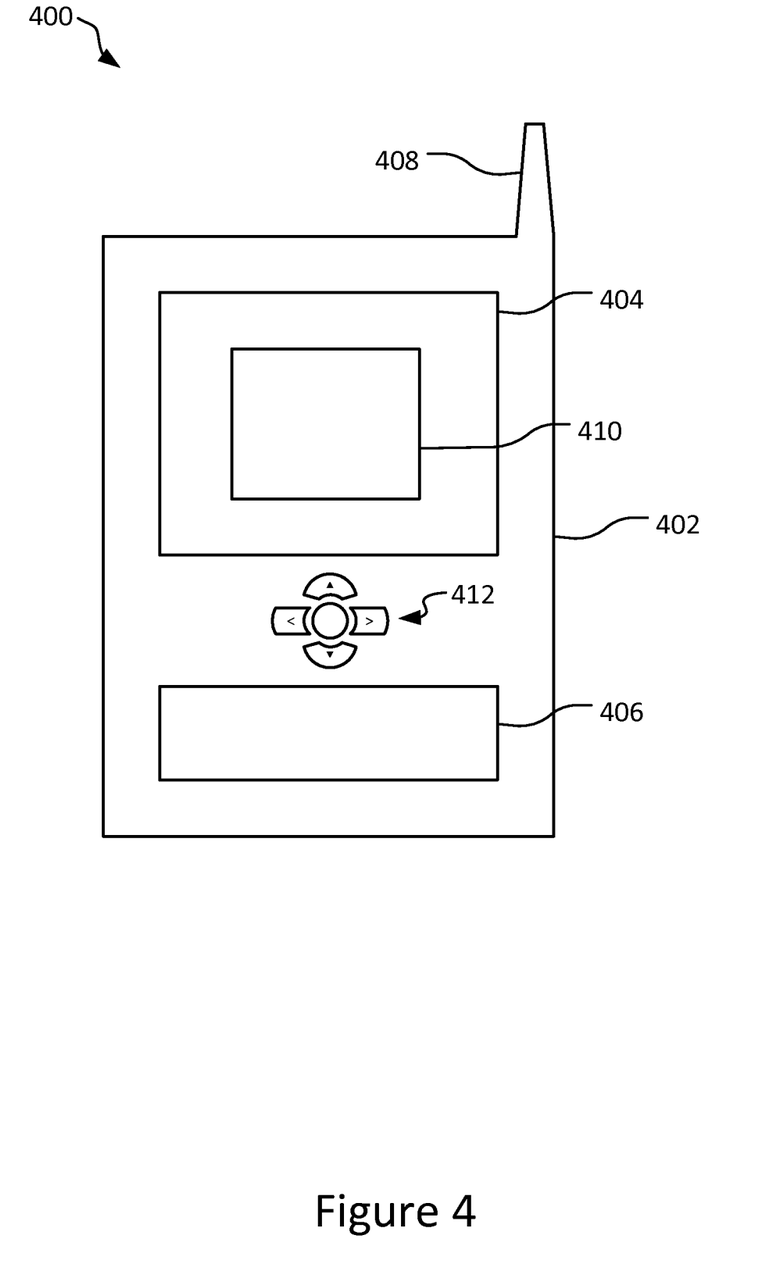
FIG. 4 illustrates embodiments of a small form factor device in which the system of FIG. 3 may be embodied.

As described above, system 300 may be embodied in varying physical styles or form factors. FIG. 4 illustrates embodiments of a small form factor device 400 in which system 300 may be embodied. In some embodiments, for example, device 400 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet, or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 4, device 400 may comprise a housing 402, a display 404, a user interface 410, an input/output (I/O) device 406, and an antenna 408. Device 400 also may comprise navigation features 412. Display 404 may comprise any suitable display unit for displaying information appropriate for a mobile computing device. I/O device 406 may comprise any suitable I/O device for entering information into a mobile computing device. Examples for I/O device 406 may include an alphanumeric keyboard, a numeric keypad, a touch pad, input keys, buttons, switches, rocker switches, microphones, speakers, voice recognition device and software, and so forth. Information also may be entered into device 400 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits (IC), application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds, and other design or performance constraints.

Some embodiments may be implemented, for example, using a machine-readable medium or article, which may store an instruction or a set of instructions that, if executed by a machine, may cause the machine to perform a method and/or operations in accordance with an embodiment. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled, and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers, or other such information storage, transmission, or displays. The embodiments are not limited in this context.

Further Example Embodiments

The following examples pertain to further embodiments, from which numerous permutations and configurations will be apparent.

Example 1 is a method of controlling data transmission comprising: receiving data packets at a plurality of data buffers from a plurality of data sources, each data buffer for providing data to a multiplexor (MUX); monitoring the value of each of the MUX data buffers, the value indicating the buffer fill level; and controlling transmission of data packets to at least one of the MUX data buffers based on the value of at least one of the MUX data buffers.

Example 2 includes the subject matter of Example 1, wherein the MUX data buffers are first-in-first-out (FIFO) data buffers.

Example 3 includes the subject matter of any of Examples 1-2, further comprising caching, in at least one memory operatively coupled to the backpressure rate control module (BPRC), data packets prior to transmission to at least one of the MUX data buffers.

Example 4 includes the subject matter of any of Examples 1-3, further comprising: calculating the sum of the values of each of the plurality of MUX data buffers; determining a global threshold value; and comparing the sum with the global threshold value, and wherein controlling transmission of data packets comprises transmitting a data packet to at least one of the MUX data buffers when the sum is less than the global threshold value.

Example 5 includes the subject matter of Example 4, wherein determining a global threshold value comprises determining a separate global threshold value for each of the MUX data buffers.

Example 6 includes the subject matter of any of Examples 4-5, wherein the global threshold value is user configurable.

Example 7 includes the subject matter of any of Examples 1-6, further comprising determining an individual threshold value for each of the plurality of MUX data buffers, and wherein controlling transmission of the data packets comprises comparing each of the individual threshold values with the value of its corresponding MUX data buffer.

Example 8 includes the subject matter of Example 7, wherein controlling transmission of data packets further comprises transmitting a data packet when the value of at least one of the plurality of MUX data buffers is below its corresponding individual threshold value.

Example 9 includes the subject matter of any of Examples 7-8, wherein controlling transmission of data packets further comprises transmitting a data packet when the value of each of the plurality of MUX data buffers is below its corresponding individual threshold value.

Example 10 includes the subject matter of any of Examples 8-9, wherein the individual threshold value is user configurable.

Example 11 includes the subject matter of any of Examples 7-10, wherein controlling transmission of data packets comprises transmitting a data packet when the sum is less than the global threshold value and the value of each of the plurality of MUX data buffers is below its corresponding individual threshold value.

Example 12 includes the subject matter of any of Examples 1-11, further comprising transmitting data packets to the multiplexer.

Example 13 is a computer program product encoded with instructions that, when executed by one or more processors, causes a process for controlling data transmission to be carried out, the process comprising: receiving data packets at a plurality of data buffers from a plurality of data sources, each data buffer for providing data to a multiplexor (MUX); monitoring, with a backpressure rate control module, the value of each of the MUX data buffers, the value indicating buffer fill level; and controlling, with the backpressure rate control module, transmission of data packets to at least one of the MUX data buffers based on the value of at least one of the plurality of MUX data buffers.

Example 14 includes the subject matter of Example 13 wherein the plurality of MUX data buffers are FIFO data buffers.

Example 15 includes the subject matter of any of Examples 13-14, process further comprising caching, in at least one memory operatively coupled to the backpressure rate control module, data packets prior to transmission to at least one of the MUX data buffers.

Example 16 includes the subject matter of any of Examples 13-15, the process further comprising: calculating the sum of the values of each of the plurality of MUX data buffers; determining a global threshold value; and comparing the sum with the global threshold value, and wherein controlling transmission of data packets comprises transmitting a data packet to at least one of the MUX data buffers when the sum is less than the global threshold value.

Example 17 includes the subject matter of Example 16, wherein determining a global threshold value comprises determining a separate global threshold value for each of the MUX data buffers.

Example 18 includes the subject matter of any of Examples 16-17, wherein the global threshold value is user configurable.

Example 19 includes the subject matter of any of Examples 13-18, further comprising determining an individual threshold value for each of the MUX data buffers, and wherein controlling transmission of the data packets comprises comparing each of the individual threshold values with the value of its corresponding MUX data buffer.

Example 20 includes the subject matter of Example 19, wherein controlling transmission of data packets further comprises transmitting a data packet when the value of at least one of the MUX data buffers is below its corresponding individual threshold value.

Example 21 includes the subject matter of any of Examples 19-20, wherein controlling transmission of data packets further comprises transmitting a data packet when the value of each of the MUX data buffers is below its corresponding individual threshold value.

Example 22 includes the subject matter of any of Examples 19-21, wherein the individual threshold value is user configurable.

Example 23 includes the subject matter of any of Examples 19-22, wherein controlling transmission of data packets comprises transmitting a data packet when the sum is less than the global threshold value and the value of each of the MUX data buffers is below its corresponding individual threshold value.

Example 24 includes the subject matter of any of Examples 13-23, the process further comprising transmitting data packets to the multiplexer.

Example 25 is a multichannel data transmission system, comprising: a memory for receiving data packets from a digital tuner; and a backpressure rate control module configured to monitor the value of each of a plurality of data buffers, each data buffer for providing data to a multiplexor (MUX), the backpressure rate control module further configured to control transmission of the data packets from the memory to at least one of the MUX data buffers based on the value of at least one of the MUX data buffers, the value indicating buffer fill level.

Example 26 includes the subject matter of Example 25, further comprising the plurality of MUX data buffers.

Example 27 includes the subject matter of any of Examples 25-26, further comprising the multiplexor.

Example 28 includes the subject matter of Example 27, further comprising a termination device configured to receive data packets from the multiplexor.

Example 29 includes the subject matter of any of Examples 25-28, further comprising the digital tuner.

Example 30 includes the subject matter of any of Examples 26-29, wherein the plurality of MUX data buffers are FIFO data buffers.

Example 31 includes the subject matter of any of Examples 25-30, wherein the backpressure rate control module is configured to control transmission of the data packets by monitoring the value of each of the MUX data buffers and transmitting a data packet to at least one of the MUX data buffers based on the value of each of the MUX data buffers.

Example 32 includes the subject matter of any of Examples 25-30, wherein the backpressure rate control module is further configured to determine an individual threshold value for each of the MUX data buffers, and control transmission of the data packets by monitoring the value of each of the MUX data buffers and transmitting a data packet to at least one of the MUX data buffers when the value of each of the MUX data buffers is below its corresponding individual threshold value.

Example 33 includes the subject matter of any of Examples 25-30, wherein the backpressure rate control module is configured to control transmission of the data packets by calculating the sum of the values of each of the MUX data buffers and transmitting a data packet to at least one of the MUX data buffers based on the value of the sum.

Example 34 includes the subject matter of Example 32, wherein the backpressure rate control module is configured to control transmission of the data packets by transmitting a data packet to at least one of the MUX data buffers when the value of the sum is less than a global threshold value.

Example 35 includes the subject matter of any of Examples 32 or 34, wherein at least one of the individual threshold value and/or the global threshold value is user configurable.

Example 36 is a conditional access system for providing digital television, the system including the subject matter of any of Examples 25-35.

Example 37 includes the subject matter of any of Examples 25-36, and further includes at least one of: one or more general purpose processors; one or more digital tuners; a graphics processing unit (GPU) or a visual processing unit (VPU); a radio for transmitting and/or receiving wireless communications; a network interface for interfacing the system to a wired communication network; a video controller; an audio controller; and a display.

Example 38 is a computer program product encoded with instructions that, when executed by one or more processors, causes a process for controlling data transmission to be carried out, the process comprising: receiving data packets at a plurality of primary FIFO buffers from a plurality of direct data sources, each data buffer for providing data to a multiplexor (MUX); monitoring the value of each of the plurality of primary MUX FIFO buffers, the value indicating buffer fill level; receiving data packets from at least one indirect data source at at least one memory operatively coupled to a backpressure rate control module; transmitting data packets from the at least one memory, using the at least one backpressure rate control module, to at least one secondary MUX FIFO buffer based on the values of each of the primary MUX FIFO buffers; transmitting data packets from each of the primary and secondary MUX FIFO buffers to a multiplexer; and transmitting data packets from the multiplexer to a conditional access system.

Example 39 includes the subject matter of Example 38, the process further comprising monitoring the value of the at least one secondary MUX FIFO buffer, and transmitting data packets from the at least one memory to the at least one secondary MUX FIFO buffer based on the values of the primary and secondary MUX FIFO buffers.

Example 40 includes the subject matter of any of Examples 38-39, the process further comprising monitoring the value of the at least one secondary MUX FIFO buffer, and transmitting data packets from the at least one memory to the at least one secondary MUX FIFO buffer when the values of each of the primary and secondary MUX FIFO buffers are below a threshold value.

Example 41 includes the subject matter of any of Examples 38-40, the process further comprising performing quality of service monitoring on each of the primary and secondary MUX FIFO buffers by prioritizing data packet transmission from the plurality of primary and secondary MUX FIFO buffers.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A method of controlling data transmission comprising:
receiving data packets from a plurality of digital tuners, the data packets to be provided to a digital video broadcasting conditional access system (CAS);
filtering the data packets to remove packets that are not being viewed or recorded by the CAS;
receiving the filtered data packets at a plurality of multiplexor (MUX) data buffers, each of the MUX data buffers for providing data to a MUX configured to multiplex the data buffers to the CAS, wherein at least one of the MUX data buffers is directly coupled to one of the digital tuners, and at least another of the MUX data buffers is indirectly coupled to another of the digital tuners through a backpressure rate control module (BPRC) and a BPRC buffer;
monitoring a value of each of the MUX data buffers, the value indicating fill level of the MUX data buffer; and
controlling, by the BPRC module, transmission of the filtered data packets from the BPRC buffer to at least one of the MUX data buffers based on the value of at least one of the MUX data buffers.

2. The method of claim 1 further comprising:
calculating a sum of the values of each of the plurality of MUX data buffers;
determining a global threshold value; and
comparing the sum with the global threshold value, and wherein controlling transmission of the filtered data packets comprises transmitting the filtered data packet to at least one of the MUX data buffers when the sum is less than the global threshold value.

3. The method of claim 2 wherein determining a global threshold value comprises determining a separate global threshold value for each of the MUX data buffers.

4. The method of claim 2 further comprising determining an individual threshold value for each of the plurality of MUX data buffers, and wherein controlling transmission of the filtered data packets comprises transmitting the filtered data packet when the sum is less than the global threshold value and the value of each of the plurality of MUX data buffers is below its corresponding individual threshold value.

5. The method of claim 1 further comprising determining an individual threshold value for each of the plurality of MUX data buffers, and wherein controlling transmission of the filtered data packets further comprises transmitting the filtered data packet when the value of at least one of the plurality of MUX data buffers is below its corresponding individual threshold value.

6. The method of claim 1 further comprising determining an individual threshold value for each of the plurality of MUX data buffers, and wherein controlling transmission of the filtered data packets further comprises transmitting the filtered data packet when the value of each of the plurality of MUX data buffers is below its corresponding individual threshold value.

7. At least one computer program product encoded with instructions that, when executed by one or more processors, causes a process for controlling data transmission to be carried out, the process comprising:
receiving data packets from a plurality of digital tuners, the data packets to be provided to a digital video broadcasting conditional access system (CAS);
filtering the data packets to remove packets that are not being viewed or recorded by the CAS;
receiving the filtered data packets at a plurality of multiplexor (MUX) data buffers, each of the MUX data buffers for providing data to a MUX configured to multiplex the data buffers to the CAS, wherein at least one of the MUX data buffers is directly coupled to one of the digital tuners, and at least another of the MUX data buffers is indirectly coupled to another of the digital tuners through a backpressure rate control module (BPRC) and a BPRC buffer;
monitoring a value of each of the MUX data buffers, the value indicating fill level of the MUX data buffer; and
controlling, by the BPRC module, transmission of the filtered data packets from the BPRC buffer to at least one of the MUX data buffers based on the value of at least one of the MUX data buffers.

8. The at least one computer program product of claim 7, the process further comprising:
calculating a sum of the values of each of the plurality of MUX data buffers;
determining a global threshold value; and comparing the sum with the global threshold value, and wherein controlling transmission of the filtered data packets comprises transmitting the filtered data packet to at least one of the MUX data buffers when the sum is less than the global threshold value.

9. The at least one computer program product of claim 8 wherein determining a global threshold value comprises determining a separate global threshold value for each of the MUX data buffers.

10. The at least one computer program product of claim 8 further comprising determining an individual threshold value for each of the plurality of MUX data buffers, and wherein controlling transmission of the filtered data packets comprises transmitting the filtered data packet when the sum is less than the global threshold value and the value of each of the plurality of MUX data buffers is below its corresponding individual threshold value.

11. The at least one computer program product of claim 7 further comprising determining an individual threshold value for each of the plurality of MUX data buffers, and wherein controlling transmission of the filtered data packets further comprises transmitting the filtered data packet when the value of at least one of the plurality of MUX data buffers is below its corresponding individual threshold value.

12. The at least one computer program product of claim 7 further comprising determining an individual threshold value for each of the plurality of MUX data buffers, and wherein controlling transmission of the filtered data packets further comprises transmitting the filtered data packet when the value of each of the plurality of MUX data buffers is below its corresponding individual threshold value.

13. A multichannel data transmission system, comprising:
a plurality of digital tuners to generate data packets to be provided to a digital video broadcasting conditional access system (CAS);
a plurality of filters to filter the data packets to remove packets that are not being viewed or recorded by the CAS;
a plurality of multiplexor (MUX) data buffers, each of the MUX data buffers for providing data to a MUX configured to multiplex the data buffers to the CAS, wherein at least one of the MUX data buffers is directly coupled to one of the digital tuners, and at least another of the MUX data buffers is indirectly coupled to another of the digital tuners through a backpressure rate control module (BPRC) and a BPRC buffer; and
the BPRC to monitor a value of each of the MUX data buffers, the value indicating fill level of the MUX data buffer, and to control transmission of the filtered data packets from the BPRC buffer to at least one of the MUX data buffers based on the value of at least one of the MUX data buffers.

14. The system of claim 13 wherein the backpressure rate control module is configured to control transmission of the filtered data packets by calculating a sum of the values of each of the MUX data buffers and transmitting the filtered data packet to at least one of the MUX data buffers based on the value of the sum.

15. The system of claim 14 wherein the backpressure rate control module is further configured to control transmission of the filtered data packets by transmitting filtered data packet to at least one of the MUX data buffers when the value of the sum is less than a global threshold value.

16. The system of claim 13 wherein the backpressure rate control module is further configured to determine an individual threshold value for each of the MUX data buffers, and control transmission of the filtered data packets by monitoring the value of each of the MUX data buffers and transmitting filtered data packet to at least one of the MUX data buffers when the value of each of the MUX data buffers is below its corresponding individual threshold value.

17. The system of claim 16 wherein at least one of the individual threshold value and/or the global threshold value is user configurable.

18. The system of claim 13 further comprising at least one of:
one or more general purpose processors;
one or more digital tuners;
a graphics processing unit (GPU) or a visual processing unit (VPU);
a radio for transmitting and/or receiving wireless communications;
a network interface for interfacing the system to a wired communication network;
a video controller;
an audio controller; and
a display.

* * * * *